UNITED STATES PATENT OFFICE.

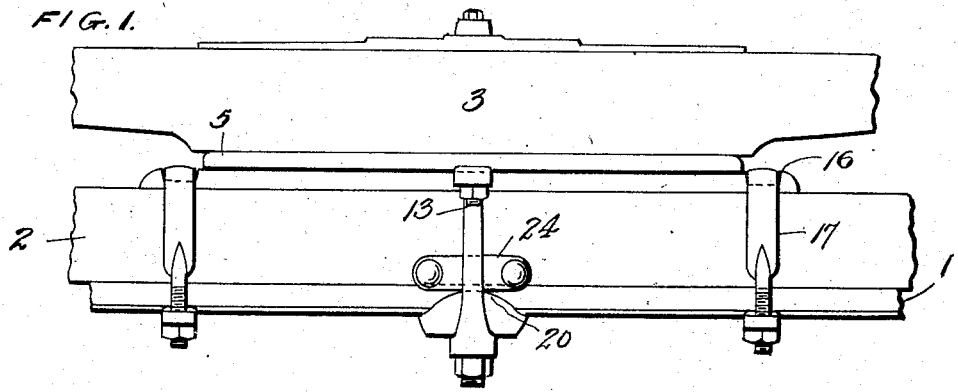
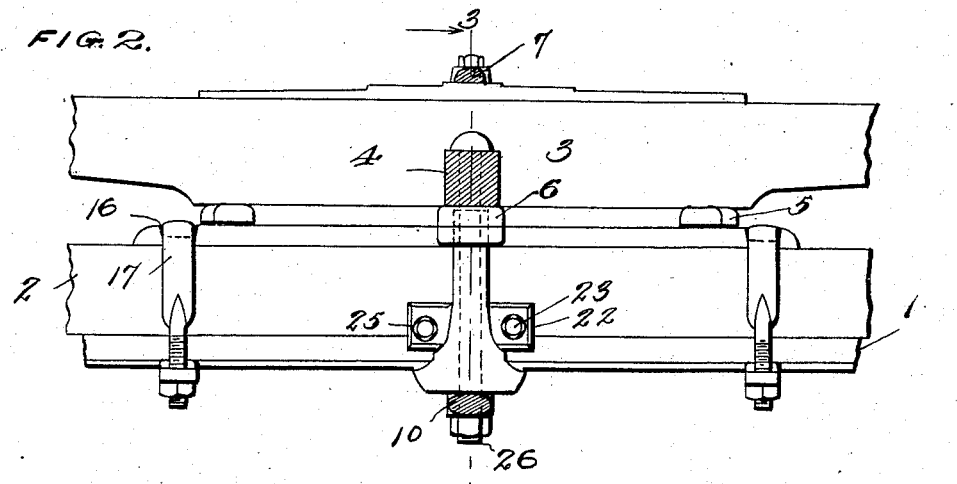
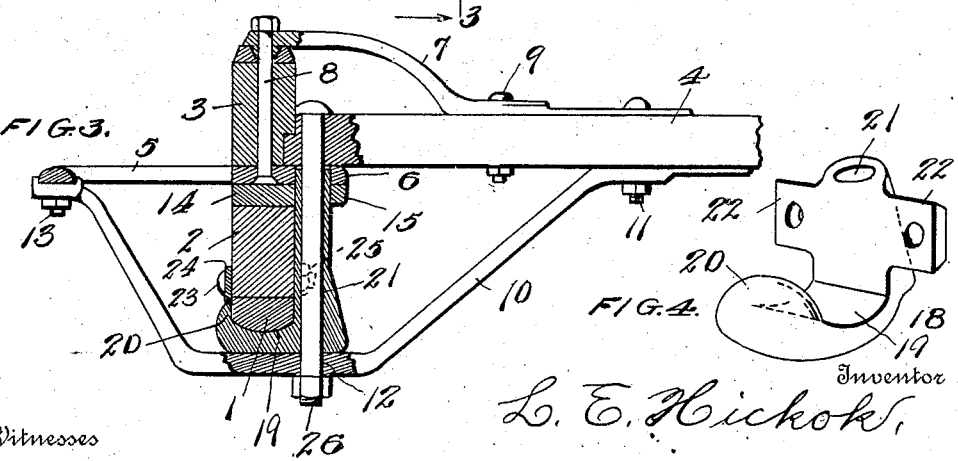

LESTER E. HICKOK, OF CLEVELAND, OHIO, ASSIGNOR OF ONE-HALF TO THE CLEVELAND HARDWARE COMPANY, OF CLEVELAND, OHIO.

VEHICLE-GEAR.

974,143.

Specification of Letters Patent.

Patented Nov. 1, 1910.

Application filed October 2, 1909. Serial No. 520,640.

*To all whom it may concern:*

Be it known that I, LESTER E. HICKOK, a citizen of the United States, residing at Cleveland, in the county of Cuyahoga and State of Ohio, have invented certain new and useful Improvements in Vehicle-Gears, of which the following is a specification.

My invention relates to vehicle-gears and in particular to an improved axle-yoke and king bolt socket, and also to the same in combination with other elements of the gear.

The invention consists in certain novelties of construction and combinations of parts as hereinafter set forth and claimed.

The accompanying drawing illustrates one complete example of the physical embodiment of the invention and a modification of the yoke and socket, constructed according to the best modes I have so far devised for the practical application of the principle.

Figure 1 is a front view in elevation of the central portion of an axle, axle-bed, and head block with my improvements applied in connection therewith. Fig. 2 is a rear view of Fig. 1, in elevation. Fig. 3 is a section of Fig. 2 on line 3—3. Fig. 4 is a perspective view of a modified form of the yoke and king bolt socket.

Referring to the several figures, the numeral 1 designates the axle; 2, the axle-bed; 3, the head-block; 4, the reach having a tenon fitting within a mortise in the head block; 5, a D-plate or semi-circle provided with a perforated rear lug 6 and a hole at the center of the semi-circle, the said D-plate being secured to the under surface of the head block by screws or in any other suitable way; 7, a reach brace perforated at the ends; 8, a bolt passed through a hole in the D-plate, a hole in the head block, and a perforation at the end of the reach-brace 7, and a nut applied to the bolt, as shown; 9, a bolt securing the brace 7 to the reach; 10, a king-bolt brace and yoke, the rear end thereof being perforated and secured to the reach by a threaded bolt 11 passed through the same and the end of the reach brace and reach, and a nut applied, the central part thereof perforated at 12 to receive a king bolt, and the front perforated end secured to the D-plate or semi-circle by a bolt 13, as shown; 14, the lower fifth-wheel plate or member having a rear perforated lug 15 in line with the lug 6, and seats 16 at the end to receive the clips 17 which secure the plate to the top surface of the axle bed; 18, the axle yoke and king bolt socket consisting of a forging having a seat 19 to frictionally engage the lower surface of the axle, a lip or flange 20 to bear against the front surface of the axle, a perforated socket 21 to receive the king bolt, and two perforated lugs or wings 22, 22, to receive bolts 23, which pass through the said lugs; the axle or axle bed and a washer or washers 24 at the front surface of the bed; 25, nuts applied to the threaded ends of the bolts; and 26 is the threaded king bolt which is passed through a hole in the reach, the perforated lugs at the rear edges of the fifth-wheel elements or members, the socket 21 and the hole in the king bolt brace and yoke, said king bolt being provided with a nut, as shown.

In Figs. 1, 2 and 3, the socket 21 is extended so as to pass through the lug 6 and the lug 15 forming a bearing of relatively large area and relieving the king bolt of all strains adjacent the lugs.

In Fig. 4 the perforated king bolt socket is of less length than that shown by the other figures, and when this form is used the lugs 6 and 15 may be provided with interlocking means in any well known way.

From the drawing and description it will be clear that I have provided a very simple yoke and socket which is securely held in position without the use of a separate clip at the front surface of the axle, thus simplifying the construction.

What I claim is:

1. The combination in a vehicle gear having a perforated top fifth wheel member, an axle, and a reach, of an integral axle yoke and king bolt socket provided with a seat engaging the lower surface of the axle, a lip engaging the front surface of the axle, and a perforated socket to receive a king bolt said socket engaging the rear surface of the axle; a perforated brace secured to the reach and passed under the socket and axle; a threaded king bolt passed through the perforation in the top fifth wheel member, the perforation in the socket, and the perforation in the brace; and a nut on the king bolt.

2. The combination in a vehicle gear having a perforated top fifth wheel member, an axle, a reach, and an axle bed, of an integral axle yoke and king bolt socket having a seat engaging the lower surface of the axle, a lip engaging the front surface of the axle, a perforated socket to receive a king bolt, and two perforated wings; a perforated brace secured to the reach and passed under the socket and axle; bolts passed through the wings of the socket and the axle bed; and a king bolt passed through the perforation in the top fifth wheel member, the socket, and the brace and provided with a nut, thus uniting the parts.

3. The combination in a vehicle gear, of fifth-wheel members each having a perforated lug at its rear edge; a perforated brace; an integral yoke and socket having a seat engaging the lower surface of the axle, a flange or lip engaging the front lower surface of the axle and a perforated socket with its top end passed through the perforations in the lugs of the fifth-wheel members; and a king bolt and nut, said king bolt passing through the perforations in the lugs of the fifth wheel members, the socket, and the brace.

4. The combination in a vehicle gear, of fifth-wheel members each having a perforated lug; a perforated brace; an integral yoke and socket having a seat, a flange or lip, two perforated wings or lugs, and a perforated socket with its top end passed through the perforations in the lugs of the fifth-wheel members; and a king bolt uniting the several parts; the said integral yoke and socket being applied so the seat therein engages the lower surface of the axle and the lip engages the front lower surface of the axle.

In testimony whereof I affix my signature in presence of two witnesses.

LESTER E. HICKOK.

Witnesses:
WILLIAM LAVINGNA,
DISRAELI ALSTON.